United States Patent
Kruschhausen et al.

(10) Patent No.: US 6,726,273 B2
(45) Date of Patent: Apr. 27, 2004

(54) COVERING DEVICE FOR THE UNDERSIDE OF A MOTOR VEHICLE, A MOTOR VEHICLE, AND A METHOD OF MAKING SAME

(75) Inventors: Heinz-Arno Kruschhausen, Wiernsheim (DE); Alexander Kiessling, Leonberg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/175,895

(22) Filed: Jun. 21, 2002

(65) Prior Publication Data

US 2002/0195842 A1 Dec. 26, 2002

(30) Foreign Application Priority Data

Jun. 23, 2001 (DE) .......................... 101 30 358

(51) Int. Cl.[7] .............................................. B60R 27/00
(52) U.S. Cl. ...................................... 296/204; 180/69.1
(58) Field of Search .................. 296/38, 204; 180/69.1; 220/573

(56) References Cited

U.S. PATENT DOCUMENTS

| | | | |
|---|---|---|---|
| 3,279,557 A | 10/1966 | Halun | |
| 3,454,124 A * | 7/1969 | Niedek | |
| 3,776,587 A | 12/1973 | Oxlade | ................ 296/1 S |
| 4,349,078 A * | 9/1982 | Shimada et al. | |
| 4,445,584 A * | 5/1984 | Kimura et al. | |
| 4,655,307 A * | 4/1987 | Lamoureux | |

FOREIGN PATENT DOCUMENTS

| | | |
|---|---|---|
| DE | 32 39 946 | 5/1984 |
| EP | 0 888 956 A1 | 1/1999 |
| EP | 0 891 917 A1 | 1/1999 |

* cited by examiner

Primary Examiner—D. Glenn Dayoan
Assistant Examiner—Lori L. Coletta
(74) Attorney, Agent, or Firm—Crowell & Moring LLP

(57) ABSTRACT

An underside of a motor vehicle, for example, a passenger car having cross-country mobility, is equipped with a covering device which has a covering part and a fastening system for the covering part which can be mounted on the underside, the fastening system having at least one spring element. In order to protect the covering part from damage when driving over an obstacle, the spring element is arranged between the underside and the covering part, the spring forces of the spring element acting approximately at a right angle with respect to the underside.

45 Claims, 5 Drawing Sheets

COVERING DEVICE FOR THE UNDERSIDE OF A MOTOR VEHICLE, A MOTOR VEHICLE, AND A METHOD OF MAKING SAME

BACKGROUND AND SUMMARY OF THE INVENTION

This application claims the priority of German Patent Document DE 101 30 358.0, filed on Jun. 23, 2001, the disclosure of which is expressly incorporated by reference herein.

This invention relates to a covering device for the underside of a motor vehicle, comprising a covering part and a fastening system for the covering part. The fastening system can be mounted on the underside and has at least one spring element. The invention also relates to a motor vehicle having a covering device with a covering part and a fastening system for the covering part which can be mounted on the underside of the motor vehicle and which has at least one spring element.

A covering device of the above-mentioned type for the underside of a motor vehicle is known from German Patent Document DE 32 39 946 A1. This covering device has a covering part and a fastening system for the covering part. The fastening system is held, for example, on an underbody aggregate of the vehicle. The fastening system has several spring elements which are formed by tension springs suspended with prestress on the vehicle underside and on the covering part, the tensioning direction of the tension spring extending parallel to the underside. Which driving the vehicle, the covering device may generate disturbing noises.

It is therefore an aspect of certain preferred embodiments of the invention to provide a covering device of the initially mentioned type which yields when driving over an obstacle and causes no disturbing noises during operation of the vehicle.

According to this aspect, the spring element is arranged between the underside and the covering part, and spring forces of the spring element act approximately at a right angle with respect to the underside. Additional characteristics further advantageously developing the invention are present in other preferred embodiments.

Principal advantages achieved by way of certain preferred embodiments of the invention are that, as a result of the spring element with spring forces which act approximately at a right angle with respect to the vehicle underside, the vibration amplitude of the covering while driving, particularly at a high speed, can be at least reduced. As a result, disturbing noises, which may be caused by the vibration of the covering part in an air current, can be reduced. Furthermore, the covering part is prevented from striking against the underbody or the underside of the vehicle, whereby rattling noises are largely avoided, even when the covering device, according to certain preferred embodiments of the invention, is used on a motor vehicle suitable for cross-country driving. When driving over an obstacle, the covering part can yield, as a result of fastening by way of the spring element, in the direction of the vehicle underside. Consequently, on the one hand, the risk that the obstacle will be dragged along is reduced and, on the other hand, the risk of damage to the covering part is diminished. Furthermore, a targeted yield of the covering part can take place when the vehicle sinks in a soft roadway base.

Other objects, advantages and novel features of the present invention will become apparent from the following detailed description of the invention when considered in conjunction with the accompanying drawings.

DETAILED DESCRIPTION OF THE DRAWINGS

Figure 1:
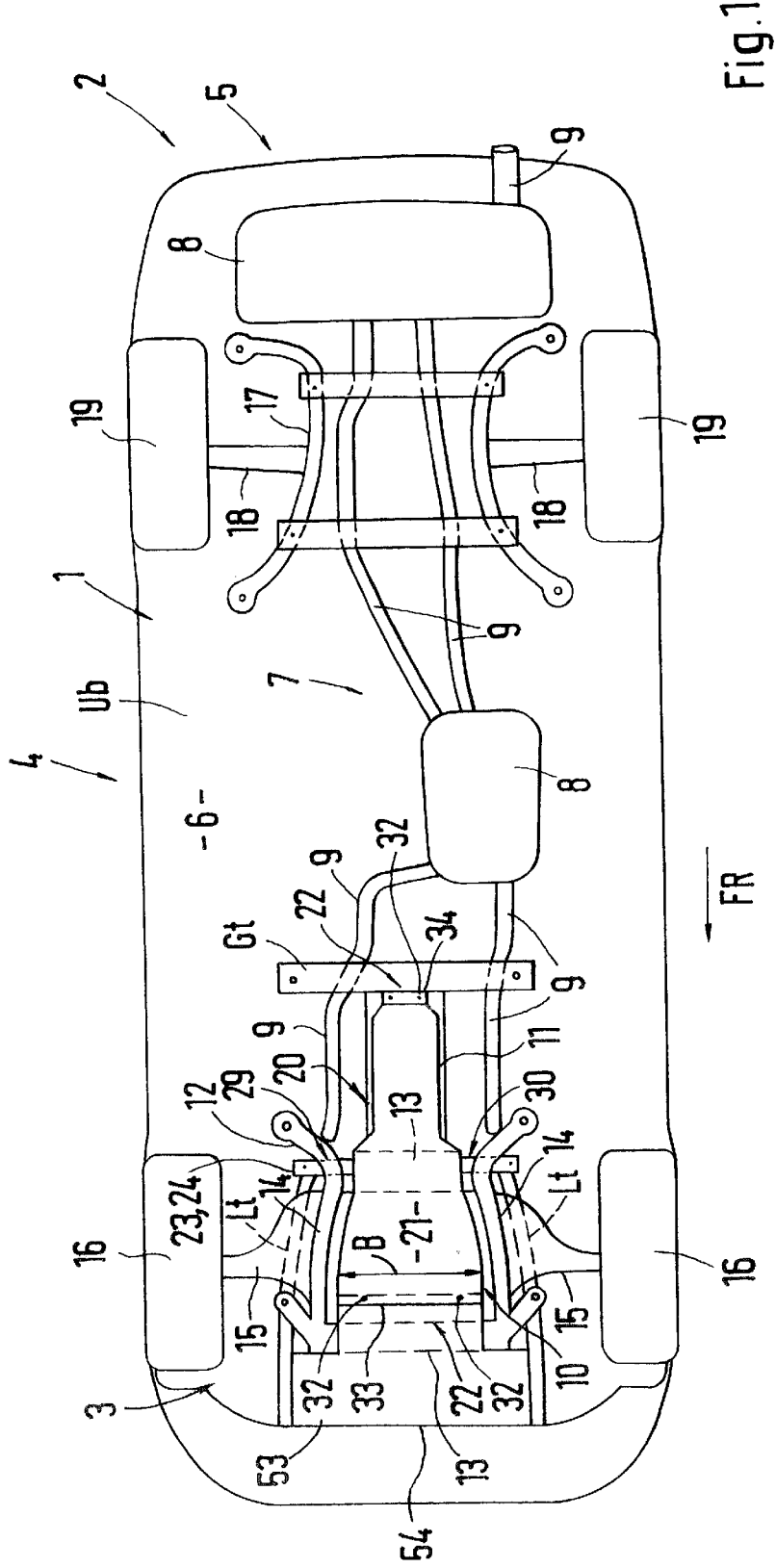
FIG. 1 shows a view of the underside of a motor vehicle having a covering device with a fastening system according to a first embodiment.

FIG. 1 illustrates the underside 1 of a motor vehicle 2 which is constructed, for example, as a passenger car. In a preferred construction, the motor vehicle 2 is capable of cross-country driving. The vehicle comprises a forward part 3, a center part 4 and a rearward part 5. A so-called body platform 6 is arranged on the underside 1, particularly on the center part 4. The body platform 6 may extend to the forward part 3 and to the rearward part 5 and has an underbody Ub and a frame member, of which only the frame side member Lt is illustrated as a cutout. In addition, an exhaust system 7, which has the mufflers 8 and the exhaust pipes 9, is provided on the underside 1. Viewed in the driving direction Fr, the forward exhaust pipes 9 lead to an internal-combustion engine, arranged in an engine compartment 10 and not shown here in detail. A transmission 11 is flanged to the internal-combustion engine. On its free end, the transmission 11 is fastened to a transmission cross-member Gt which is mounted on the underside 1. In the area of the forward part 3, a subframe 12 is fastened on the underside 1. This subframe 12 has one or several cross-members 13 and, for example, two side members 14, so that, in the top view, the subframe 12 has a frame-type design. The subframe 12 can be constructed in one piece or in several parts. Chassis parts 15 are linked to the subframe 12 and are used for receiving wheels 16 of the front axle. Another subframe 17 which is arranged on the underside 1 is provided in the area of the rearward part 5. At the rearward subframe 17, chassis parts 18 are provided for wheels 19 which are part of the rear axle of the motor vehicle 2.

On the underside 1 of the vehicle, a covering device 20 is arranged. The covering device has a covering part 21 and a fastening system 22 by way of which the covering part 21 is held on the underside 1. As illustrated in FIG. 1, the covering part 21 covers the engine compartment 10 from the direction of the underside 1. The covering part 21 extends, against the driving direction Fr, to below the transmission 11, and preferably to the transmission cross-member Gt. The covering part 21, viewed against the driving direction Fr, tapers in its width B and is thereby adapted to the opening contour of the engine compartment 10 and to the width of the transmission 11. In addition, the width B is selected such that a minimal distance is present from the exhaust system 7. In addition, the boundary edges Br of the covering part are preferably adapted to the course of the member of the subframe 12. In particular, the covering part 21 can be moved between the side members 14 of the subframe 12 in the direction of the underside or underbody of the vehicle 2.

The fastening system 22 for the covering part 21 has at least one spring element 23 (FIG. 2) which is arranged between the underside 1 and the covering part 21. The spring element 23 is constructed as a bending spring 24, particularly a leaf spring. In another embodiment of a fastening system 122 (FIG. 5), the spring element 23 is formed by a pressure spring 25, particularly a coil spring. The spring forces of the spring element 23 act essentially approximately at a right angle with respect to the plane of the underside 1, so that the covering part 21 is situated at a distance from the underside 1 and can yield against the force of the spring element 23.

Figure 2:
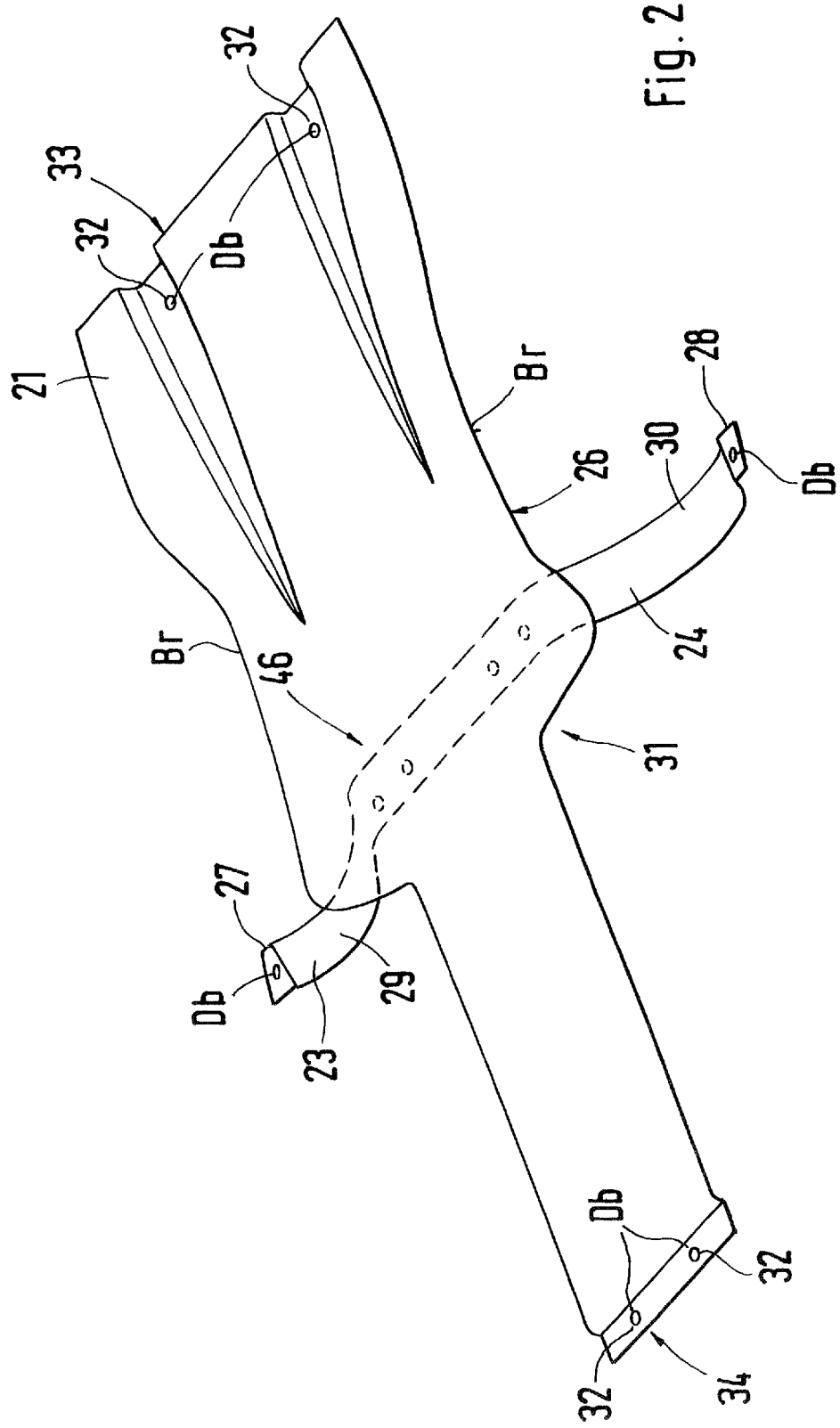
FIG. 2 shows a perspective view of the covering device according to FIG. 1.

According to FIG. 2, the leaf spring or bending spring 24 is fastened to the interior side 26 of the covering part 21 facing the underside 1. The bending spring 24 extends transversely, at a right angle, with respect to the driving direction Fr as well as approximately parallel to the underside 1 and projects beyond the lateral boundary edges Br of the covering part 21. At the ends 27 and 28 protruding over the edges Br, the bending spring 24 has bent spring areas 29, 30. Each of thee areas has, at its free end, a fastening device or opening Db for the reaching-through of fastening devices (not shown), so that the covering part 21 can be mounted on the underside 1. The bent spring areas 29 and 30 reach over the side members 14 of the subframe 12 between the underside 1 and the subframe 12, so that the free ends 27 and 28 of the bending spring 24 can be fastened to the underside 1. The spring element 23 which, in the embodiment according to FIG. 2, is the bending spring 24, is fastened approximately in the center in the area of the step-type transition 31 of the covering part 21, which therefore tapers against the driving direction Fr, preferably in a step-type manner. The fastening system 22 has, for example, additional fastening devices 32, which may be constructed, for example, in the area of the forward end 33 and rearward end 34 on the covering part 21 or applied to the latter. Openings Db may also be provided for this purpose. In the area of the forward end 33, the fastening devices 32, preferably formed by rigid fastening devices such as screws or the like, reach through openings Db and are screwed into the subframe 12 or the underside 1. In particular, the covering part 21 is fastened at its forward end 33 by way of rigid fastening devices to the underside 1. Preferably, the covering part is fastened to a member, for example a side member or cross-member, of the frame or of the body platform 6. As an alternative, the covering part 21 can be held on the subframe 12, for example on a cross-member 13.

Figure 3:
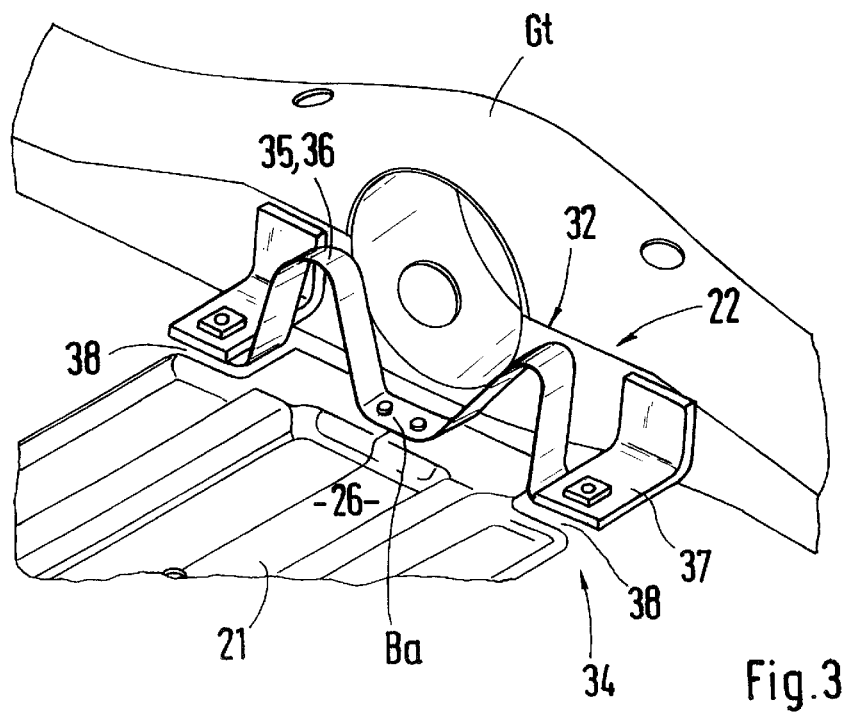
FIGS. 3 to 7 show views of other embodiments of a fastening system of the covering device.

At the rearward end 34 of the covering part 21, at least a second spring element 35 (FIG. 3) can be provided as the fastening device 32, which spring element 35 (FIG. 3) rests on the interior side 26 of the covering part 21 or is fixed there. The second spring element 35 is constructed, for example, as an approximately M-shaped bent leaf spring 36 which is fastened with its base Ba on the covering part 21. The free ends of the spring element 35 are fixed to the underside 1, particularly to the transmission cross-member, on which fastening lugs 37 are provided for this purpose. The free ends of the leaf spring 36 are mounted at free ends of the fastening lugs. Recesses 38 are provided at the corners of the covering part 21 so that the covering part 21 can be moved past the fastening lugs 37.

Figure 4:
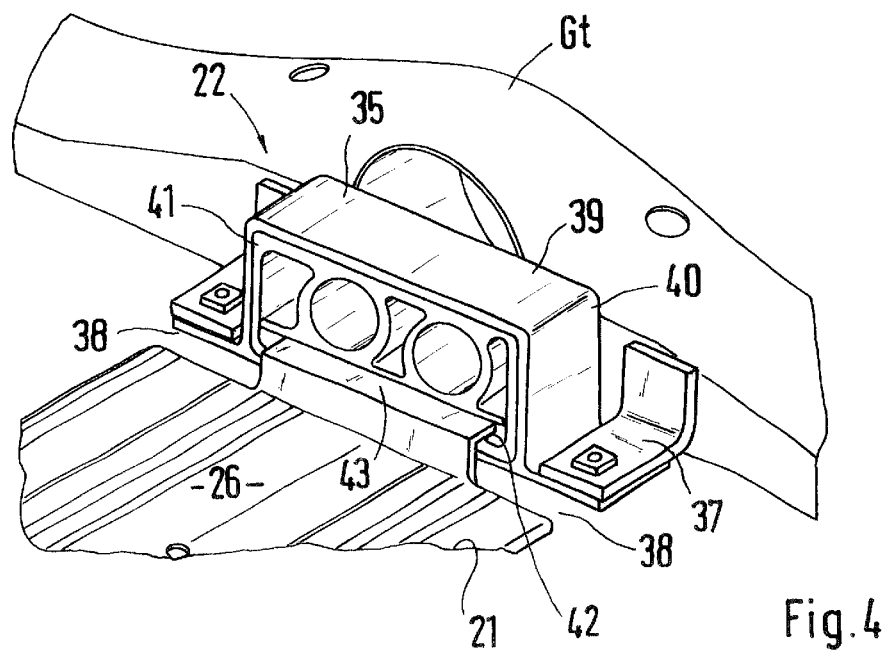

According to another embodiment, which is illustrated in FIG. 4, the second spring element 35 of the fastening system 22 is implemented as an elastically deformable damping element 39 which has a frame 40 reaching around a deformation element 41 which has a receiving device 42 into which a fastening end 43 of the covering part 21 is fitted. The deformation element 41 is made, for example, of a deformable and/or compressible (foamed) material.

Figure 5:
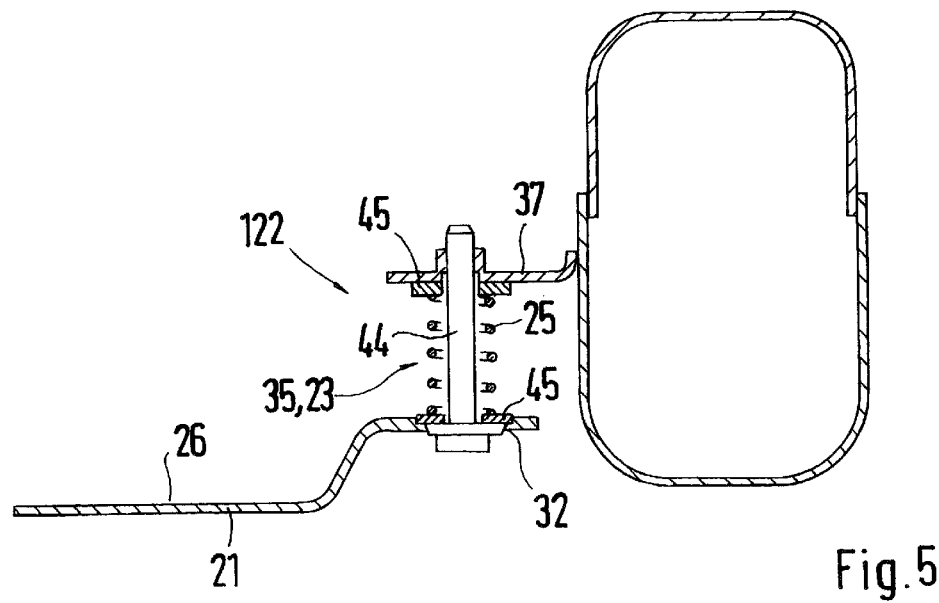

In the embodiment of the fastening device 122 according to FIG. 5, the pressure spring 25 is arranged between the fastening lug 37 and the interior side 26 of the covering part 21. A fastening screw 44, which is fixed on the fastening lug 37, reaches through the pressure spring 25. The pressure spring 25 is preferably supported on ring disks 45 which are situated on mutually facing surfaces of the fastening lug 37 and the covering part 21. Preferably, two pressure springs 25 are provided. These pressure springs may be arranged side-by-side in the transverse direction of the vehicle. The fastening system 122 illustrated in FIG. 5 can also be provided on the center area 46 of the covering part (FIG. 2) instead of the bending spring 24. For this purpose, fastening lugs 37 can be mounted on the subframe 12. According to another embodiment, the pressure springs 25 can also be supported on the underside 1, for example, on the side members Lt of the frame or of the body platform 6. Naturally, the bending springs 24 (FIG. 1) can also be supported by way of their ends 27 and 28 on these side members Lt.

Figure 6:
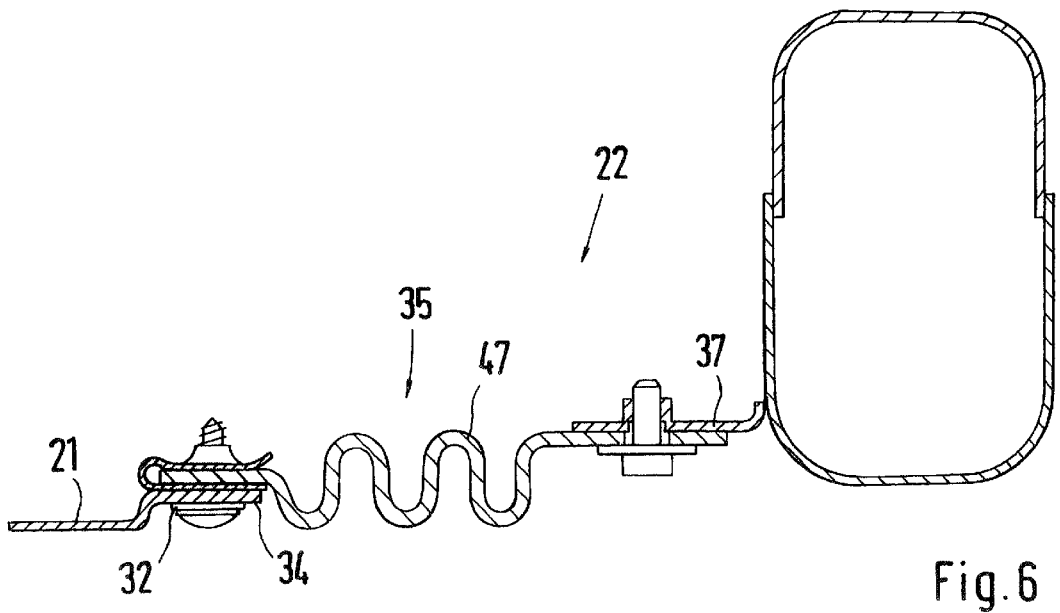

In an embodiment of a fastening system 22 according to FIG. 6, a flexible intermediate piece 47 is provided as a second spring element 35 which is connected with the rearward end 34 of the covering part 21 and the fastening lug 37. The flexible element 47 can extend in a meandering bent manner and can be connected at its straight ends with the covering part 21 and the fastening lug 37, particularly by way of screwing.

Figure 7:
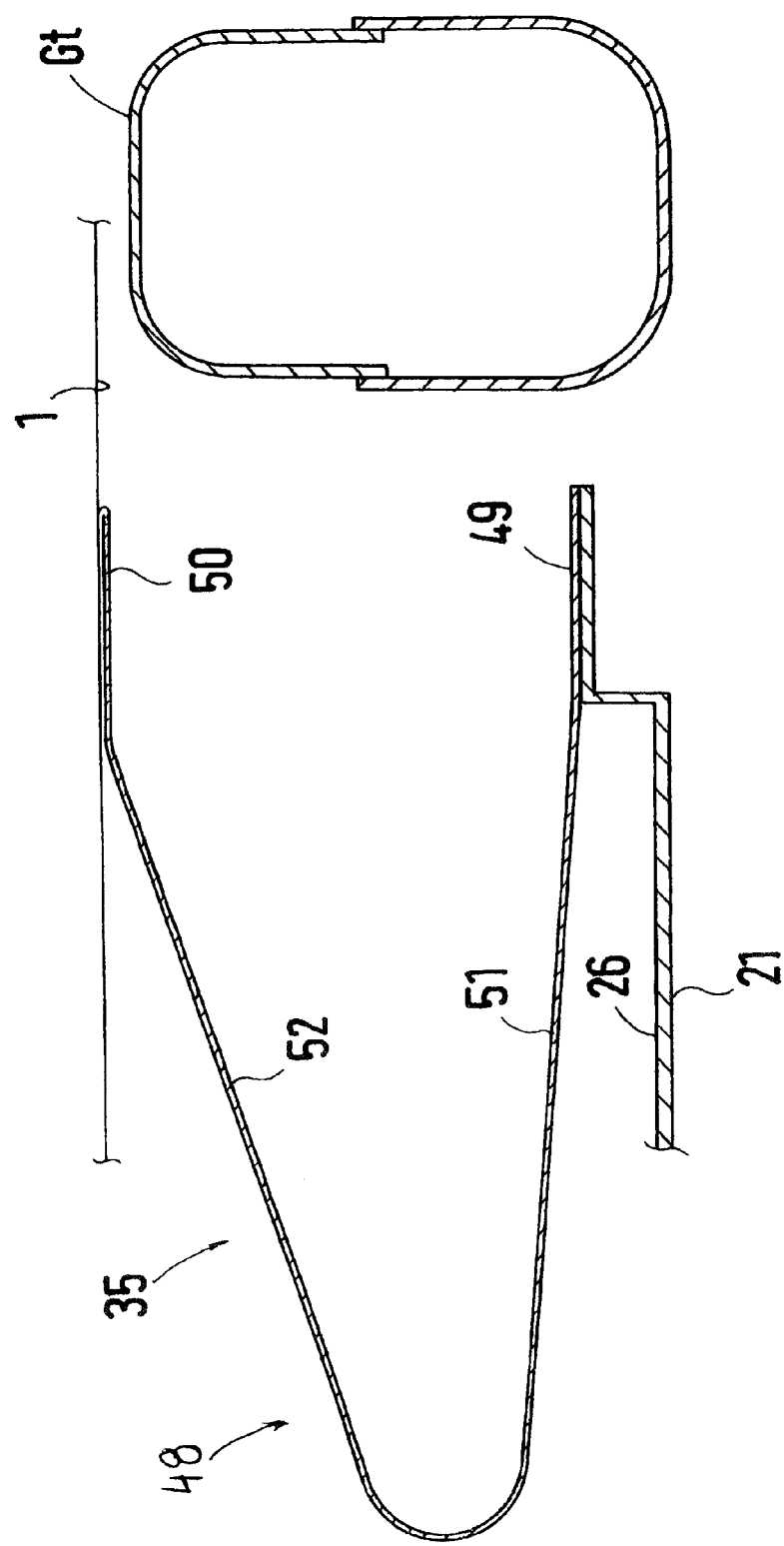

The embodiment of a spring element 35 illustrated in FIG. 7 is implemented as a leaf spring 48 and is bent approximately in a V-shape so that, on one side, its free end 49 is fixed on the covering part 21 and, on the other side, its free end 50 is fixed on the underside 1 or on the transmission cross-member Gt. The leaf spring 48 is, for example, aligned such that its spring legs 51 and 52 are situated approximately in or transversely to the driving direction Fr. Preferably, two leaf springs 48 are provided for the spring element 35; these springs may be situated side-by-side in the transverse direction of the vehicle.

The covering part 21 is therefore fastened by way of the fastening system 22 or 122 to the underside 1 of the vehicle 2 such that it can yield in the direction of the underside 1 when driving over an obstacle or when the vehicle sinks in terrain having soft subsoil and the underside 1 comes in contact with this soft subsoil. The covering part 21, which acts as an aerodynamic covering, is protected from damage by the elastic suspension by way of the fastening system 22 or 122, because it can yield in the direction of the underside 1 or in the direction of the transmission 11 and of the internal-combustion engine arranged in the engine compartment 10.

In a preferred embodiment, the covering device 20 comprises an additional forward covering part 53 (FIG. 1) which, in the driving direction Fr, is arranged in front of the covering part 21 on the underside 1. It may extend from a lower bumper end or body end 54 to the forward end 33 of the covering part 21. The forward end 33 and the forward covering part 53 preferably overlap to a defined extent so that both covering parts 21 and 53 are held by way of the fastening devices 32. In addition, it is possible to connect the covering part 53 with the bumper end or body end 54. However, it is also conceivable to fasten the forward covering part 53 by way of the fastening system 22 or 122 to the underside 1 and/or to the subframe 12 and/or to the end 54. Preferably, rigid fastening devices, such as screws, are used for the fastening of the forward covering part 53.

The fastening systems 22 or 122 described can also be used for other or additional covering parts which can be mounted at other points of the underside 1. The covering part 21 may also extend along additional areas of the underside 1. Also, the fastening lugs 37 may be mounted on the body platform 6.

The covering parts 21 and 53 form an aerodynamic covering for the underside 1. The forward covering part 53 can be made of a firm material, such as metal, and can be constructed as an underride protection. For reducing the exterior vehicle noise, the covering parts 21 and 53 may have noise insulation on their interior surfaces facing the underside 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What we claim is:

1. A covering device for an underside of a motor vehicle comprising a covering part and a fastening system for the covering part, said fastening system being capable of being mounted on the underside, the fastening system having at least one spring element,
   wherein the spring element is arranged between the underside and the covering part, and
   wherein spring forces of the spring element act approximately at a right angle with respect to the underside.
2. A covering device according to claim 1, wherein the spring element is a bending spring which extends transversely to the driving direction of the vehicle.
3. A covering device according to claim 2, wherein the bending spring is fastened to an interior side of the covering part facing the underside.
4. A covering device according to claim 2, wherein the bending spring is constructed as a leaf spring which has at least one bent spring area.
5. A covering device according to claim 3, wherein the bending spring is constructed as a leaf spring which has at least one bent spring area.
6. A covering device according to claim 1, wherein the fastening system additionally comprises at least one rigid fastening device.
7. A covering device according to claim 2, wherein the fastening system additionally comprises at least one rigid fastening device.
8. A covering device according to claim 3, wherein the fastening system additionally comprises at least one rigid fastening device.
9. A covering device according to claim 1, wherein the fastening system has at least a second spring element or an elastically deformable damping element.
10. A covering device according to claim 2, wherein the fastening system has at least a second spring element or an elastically deformable damping element.
11. A covering device according to claim 3, wherein the fastening system has at least a second spring element or an elastically deformable damping element.
12. A covering device according to claim 6, wherein the fastening system has at least a second spring element or an elastically deformable damping element.
13. A covering device according to claim 1, wherein the spring element is a pressure spring.
14. A covering device according to claim 13, wherein the pressure spring is a coil spring.
15. A covering device according to claim 9, wherein the second spring element is constructed as a coil spring which, on one side, is supported on an interior side of the covering part and, on another side, is supported on the underside of the vehicle.
16. A covering device according to claim 9, wherein the damping element is produced of a foamed material and is arranged between an interior side of the covering part and the underside.
17. A covering device according to claim 9, wherein the second spring element is constructed as at least one bending spring or as a pressure spring.
18. A covering device according to claim 17, wherein the at least one bending spring is a leaf spring.
19. A motor vehicle with a covering device, said covering device having a covering part and a fastening system for the covering part which is mountable on the underside of the motor vehicle, the fastening system having at least one spring element,
    wherein the spring element is arranged between an underside and the covering part, and
    wherein spring forces of the spring element act approximately at a right angle with respect to the underside.
20. A motor vehicle according to claim 19, wherein the spring element is constructed as a bending spring and is fastened to one of the underside and a subframe of the motor vehicle.
21. A motor vehicle according to claim 20, wherein the bending spring is a leaf spring.
22. A motor vehicle according to claim 21, wherein the leaf spring is fastened between a first and a second end of the covering part.
23. A motor vehicle according to claim 22, wherein the leaf spring is fastened approximately in the center of the covering part.
24. A motor vehicle according to claim 22,
    wherein the covering part is fastened with the first end, by way of a rigid fastening element, to one of a subframe, the underside, and a frame member, and
    wherein the leaf spring, viewed in a driving direction, is arranged behind the rigid fastening element.
25. A motor vehicle according to claim 20,
    wherein the bending spring has at least two bent spring areas which reach over a subframe, and
    wherein the bending spring is fastened to the underside.
26. A motor vehicle according to claim 22,
    wherein the bending spring has at least two bent spring areas which reach over a subframe, and
    wherein the bending spring is fastened to the underside.
27. A motor vehicle according to claim 24,
    wherein the bending spring has at least two bent spring areas which reach over a subframe, and
    wherein the bending spring is fastened to the underside.
28. A motor vehicle according to claim 22, wherein the second end of the covering part is fastened to one of a transmission cross-member and to the underside.
29. A motor vehicle according to claim 24, wherein the second end of the covering part is fastened to one of a transmission cross-member and to the underside.
30. A motor vehicle according to claim 26, wherein the second end of the covering part is fastened to one of a transmission cross-member and to the underside.
31. A motor vehicle according to claim 28, wherein the second end is fastened by way of at least a second spring element or an elastic damping element.
32. A motor vehicle according to claim 19, wherein the covering part extends below an internal-combustion engine and a transmission of the motor vehicle.
33. A motor vehicle according to claim 19, wherein the covering part, viewed against a driving direction, is constructed to be tapering in width.
34. A motor vehicle according to claim 33, wherein the tapering is in a stepped manner.
35. A motor vehicle according to claim 19, wherein the motor vehicle has cross-country mobility.

36. A method of making a covering device for an underside of a motor vehicle, comprising:

providing a covering part, mounting a fastening system for the covering part on the underside, said fastening system having at least one spring element, and arranging the spring element between the underside and the covering part so that spring forces of the spring element act approximately at a right angle with respect to the underside.

37. A method according to claim 36, wherein the spring element is a bending spring which extends transversely to the driving direction of the vehicle.

38. A method according to claim 37, wherein the bending spring is constructed as a leaf spring which has at least one bent spring area.

39. A method according to claim 36, wherein the fastening system additionally comprises at least one rigid fastening device.

40. A method according to claim 36, wherein the fastening system has at least a second spring element or an elastically deformable damping element.

41. A method according to claim 36, wherein the spring element is a pressure spring.

42. A method according to claim 40, wherein the second spring element is constructed as a coil spring which, on one side, is supported on an interior side of the covering part and, on another side, is supported on the underside of the vehicle.

43. A method according to claim 40, wherein the damping element is produced of a foamed material and is arranged between an interior side of the covering part and the underside.

44. A method according to claim 40, wherein the second spring element is constructed as at least one bending spring or as a pressure spring.

45. A covering device for a motor vehicle, comprising:

a covering part for an underside of the vehicle, a fastening system for the covering part mountable on the underside, and at least one spring element operatively connected to the fastening system and the covering part, arranged between the underside and the covering part and providing spring forces operatively acting at substantially a right angle to the underside.

* * * * *